No. 795,237. PATENTED JULY 18, 1905.
H. SCHMIDT.
BUNG.
APPLICATION FILED DEC. 20, 1904.
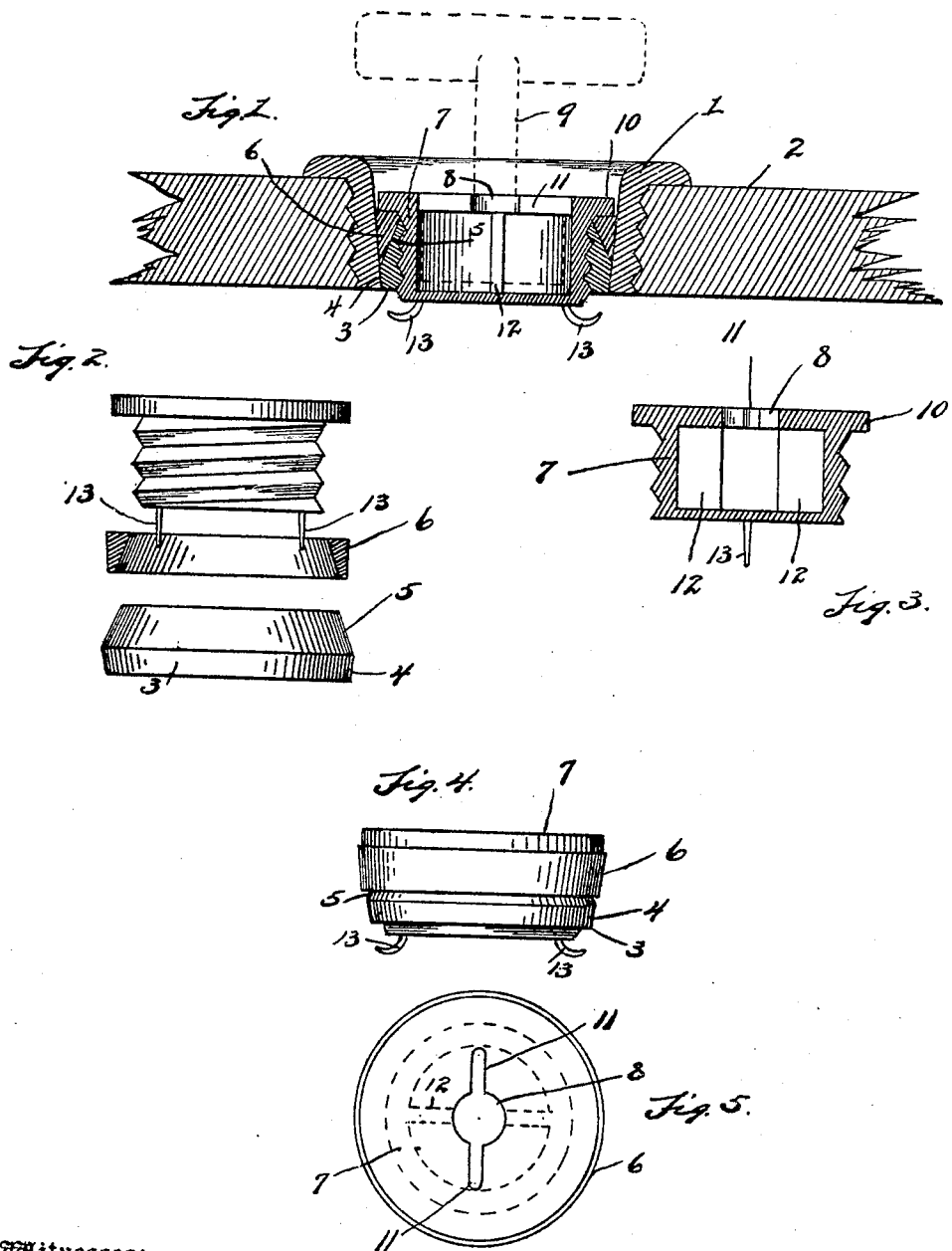

No. 795,237.

Patented July 18, 1905.

UNITED STATES PATENT OFFICE.

HENRY SCHMIDT, OF OWOSSO, MICHIGAN, ASSIGNOR OF ONE-HALF TO LOUIS MUELLER AND CHARLES MUELLER, OF OWOSSO, MICHIGAN.

BUNG.

SPECIFICATION forming part of Letters Patent No. 795,237, dated July 18, 1905.

Application filed December 20, 1904. Serial No. 237,620.

*To all whom it may concern:*

Be it known that I, HENRY SCHMIDT, a citizen of the United States, residing at Owosso, in the county of Shiawassee, State of Michigan, have invented certain new and useful Improvements in Bungs; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to new and useful improvements in bungs especially designed for use in connection with beer-kegs, beer-barrels, and similar vessels or packages; and it consists in the construction and arrangement of parts hereinafter fully set forth, and pointed out particularly in the claims.

The object of the invention is to provide simple and efficient means for closing the bung-hole or the aperture through the bung-bushing in a manner to prevent the escape of the contents, to protect the rubber or other compressible washer from the deleterious action of the beer or similar liquid, and to enable the bung to be quickly and easily removed and readily replaced, the same bung being adaptable for use many times.

The above object is attained by the construction illustrated in the accompanying drawings, in which—

Figure 1 is a sectional view through the bushing and bung, showing the bung in position for closing the aperture. Fig. 2 is a view of the parts comprising the bung disassembled, the washer appearing in transverse section. Fig. 3 is a sectional view through the central screw-plug at right angles to the sectional view of said part shown in Fig. 1. Fig. 4 is an elevation of the bung. Fig. 5 is a plan view of the bung.

Referring to the characters of reference, 1 designates the ordinary metallic bushing which is screwed into the bung-hole of the keg or barrel 2, the aperture through said bushing being tapered, as shown. Adapted to fit within the inner contracted opening of said bushing is a collar 3, whose ends are conical or tapering. The lower taper 4 of said collar is adapted to fit the taper of the bushing, while the upper taper 5 thereof is made to fit the tapered aperture through the washer 6, of rubber or other compressible material, which is adapted to fit over and lie upon the conical portion 5 of said collar. The collar 3 is internally threaded to receive the externally-threaded plug 7, adapted to screw therein, said plug being hollow and provided with an opening 8 through the top for the reception of a key 9. (Shown by dotted lines in Fig. 1.) Projecting laterally from the top of the plug is a flange 10, which is adapted to engage the washer 6 as said plug is screwed into place and compress the washer, so as to make a tight closure between its outer face and the contiguous wall of the bushing, as shown in Fig. 1.

The plug 7 is manipulated to compress the washer by means of the wings upon the key which enter through the slots 11, leading from the central opening 8 and which when the key is turned engage the radially-extending ribs 12 within the hollow plug, whereby the plug may be rotated, through the medium of the key, in either direction. To prevent the hollow plug from being withdrawn entirely from the collar 3, there are formed upon the bottom of said plug the malleable pins 13, adapted to be bent over so as to engage the lower end of the collar 3, thereby preventing the plug and collar from becoming accidentally separated.

When it is desired to remove the bung, the plug 7 is unscrewed by means of the key, so as to relieve the pressure upon the washer, when by pulling upon the handle of the key the bung may be withdrawn from the bushing.

When placing the bung in the bushing to close the keg or package, it is forced downwardly, so as to seat the conical face 4 of the collar firmly against the tapered wall of the bushing, the surfaces of which parts being preferably ground so as to make a tight joint, thereby excluding the beer or other contents of the keg from the washer 6, whereby the life of said washer is greatly prolonged.

After the collar has been firmly seated the bung is sealed by screwing the plug inwardly, so as to firmly compress the washer between the conical face 5 of the collar and the wall of the bushing.

By means of this arrangement the bung may be used many times, as it is not destroyed in opening the bung-hole, as is common, but, on the contrary, is simply withdrawn in perfect condition for subsequent use.

It is necessary to have the pins 13 malleable, so that the parts may be properly assembled, said pins being originally straight, as shown in Figs. 2 and 3. After the parts of the bung have been assembled said pins are bent over, as shown in Figs. 1 and 4.

It will be noted that the diameter of the collar 3 is such that it cannot pass through the end of the bushing, thereby preventing the bung from being forced through the bung-hole into the keg or barrel.

Having thus fully set forth my invention, what I claim as new, and desire to secure by Letters Patent, is—

1. The combination with a bushing, of a bung comprising a collar adapted to fit within the bushing having a central tapped opening, a compressible washer upon said collar, and a hollow closing-plug externally threaded adapted to screw through the collar and compress said washer.

2. The combination with a bushing, of a bung comprising a collar adapted to fit tightly within the bushing, and having a conical face, a beveled washer adapted to wedge between the conical face of the collar and the wall of the bushing, and a hollow plug threaded within the collar adapted to engage and compress said washer so as to wedge it between the conical face of the collar and the wall of the bushing.

3. The combination with a bushing having a tapered aperture therethrough, of a collar provided with a tapered face adapted to fit said aperture, and having a conical upper end, a compressible washer seated upon the conical end of said washer, a hollow plug adapted to screw bodily within said collar, having an annular flange which engages the top of said washer, whereby as the plug is screwed into the collar, said washer is wedged between the conical face of the collar and the wall of the bushing.

4. The combination with a bushing, a collar adapted to seat therein, having a large central aperture therethrough provided with an internal thread and having a beveled upper face, a washer seated on the beveled face of the collar, a hollow plug externally threaded adapted to screw through the collar and having a flange that engages said washer, and means for preventing the entire withdrawal of the plug from the collar.

5. The combination with a tapered bushing, a tapered collar adapted to seat in said bushing, said collar having a conical tapered face, a washer upon the conical face of the collar, a hollow plug adapted to screw through the collar and compress said washer, said plug having an aperture for the insertion of a key through the medium of which said plug may be rotated.

In testimony whereof I sign this specification in the presence of two witnesses.

HENRY SCHMIDT.

Witnesses:
E. S. WHEELER,
I. G. HOWLETT.